Figure 1:
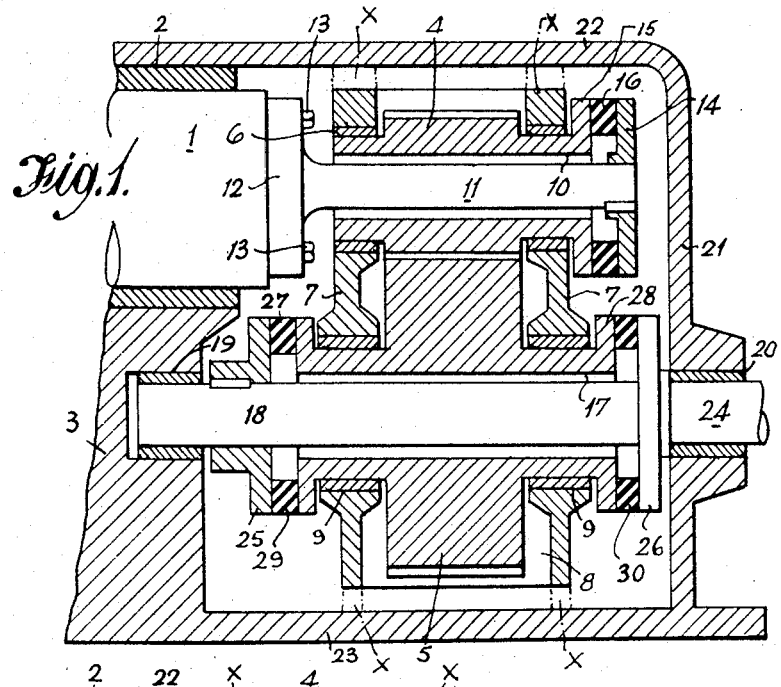

March 24, 1959 A. S. ENNIS 2,879,418
REDUCTION OF VIBRATION TRANSMISSION BETWEEN
DYNAMOELECTRIC MACHINES
Filed July 2, 1956 2 Sheets-Sheet 1

INVENTOR
Arthur S. Ennis
By Morris L. Pateman
ATTORNEYS

INVENTOR:
Arthur S. Ennis
ATTORNEYS

United States Patent Office 2,879,418
Patented Mar. 24, 1959

2,879,418

REDUCTION OF VIBRATION TRANSMISSION BETWEEN DYNAMOELECTRIC MACHINES

Arthur Samuel Ennis, Sale, England, assignor to Metropolitan-Vickers Electrical Company Limited, London, England, a British company Application July 2, 1956, Serial No. 595,381

Claims priority, application Great Britain July 7, 1955

10 Claims. (Cl. 310—83)

This invention relates to the reduction of vibration transmission from the gear drives commonly employed for driving exciters from turbo-alternators or other generating machines. Various arrangements for reducing the emanation of vibration generated by motion of the parts of mechanical assemblies or machines or apparatus having two or more relatively moving parts, for example gear drives, are described and claimed in the cognate complete specification of United States application, Serial No. 451,895, filed August 24, 1954, now Patent No. 2,822,700.

The vibration is generally of audible frequency and objectionable. The vibration is partly transmitted through the surrounding atmosphere, but vibration so transmitted can be attenuated by total enclosure of drive. Transmission of vibration also takes place directly, through the supports for the gear shafts, to the structure upon which the gear drive is mounted, and if the latter is enclosed in a casing in order to reduce airborne transmission, the casing itself will increase the effect of directly transmitted vibration.

Said specification describes and claims, for overcoming these objections, various forms of gear wheel assembly including a casing which at least partly surrounds the gear wheels and in which shafts for the gears are journalled, wherein each gear wheel of said pair is connected with the journal or journals of its shaft through resilient coupling means adapted to transmit the torque of the drive, means being provided for retaining the wheels in correctly spaced relationship independently of said shafts.

The present invention, as hereinbefore indicated, is particularly concerned with gear drives coupling exciters with alternators or other generating machines.

According to the present invention, in an electrical generator having in combination an exciter, the exciter is coupled with the armature of the generator by an enclosed gear drive comprising a casing formed at least in part by a main pedestal or like bearing support of the generator, an extension of the generator shaft through said bearing into said casing, resilient coupling means located within said casing and coupling said extension with one of the gear wheels of the gear drive, spacing means in which said gear wheels are mounted by bearings maintaining said wheels in correctly spaced relationship, said spacing means being enclosed by and resiliently mounted in said casing, and further resilient coupling means located within said casing and coupling said second wheel with an output shaft extending through the casing and coupled externally of said casing with the exciter armature.

In general, only a limited space is available for the inclusion of a gear drive for an exciter of a turbo-alternator, but some form of flexible drive is always necessary when the bearing clearances of the alternator and the gears are different from one another, as is normally the case. The arrangement according to the present invention, therefore, provides a convenient disposition of parts whereby the gear drive and resilient coupling and supporting means may be enclosed.

Reference will now be made by way of example to the accompanying drawings, in which—

Figure 2:
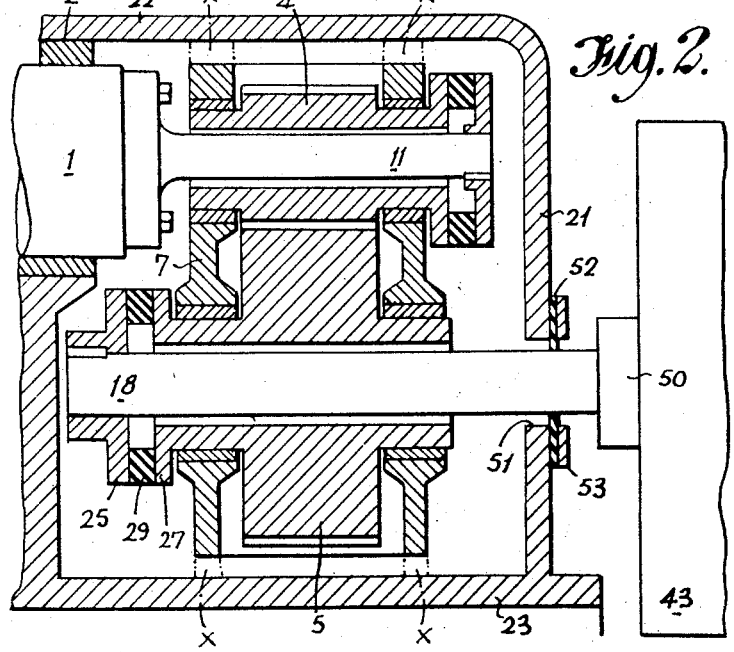
Figure 3:
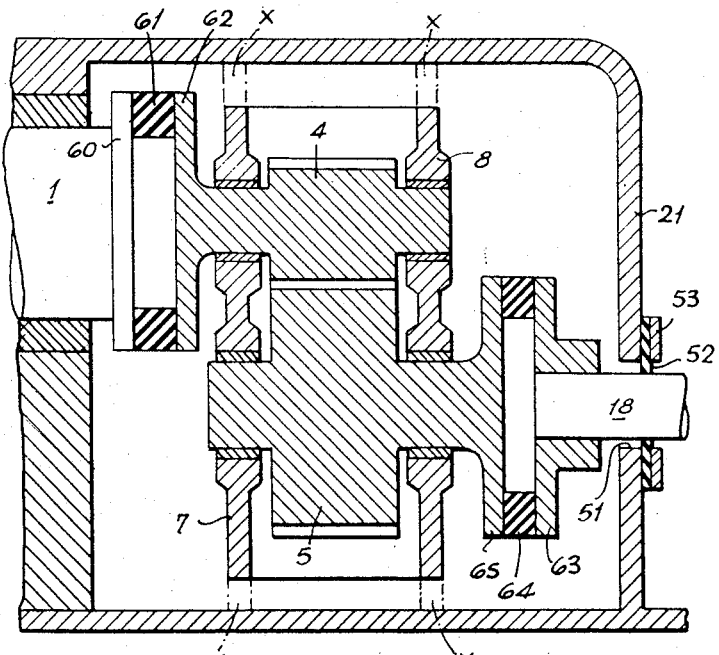
Figure 4:
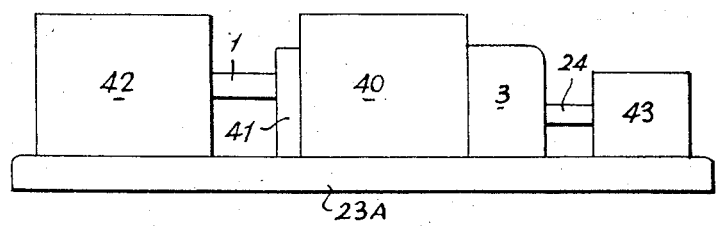

Figs. 1, 2 and 3 are fragmentary sectional elevations illustrating respectively three embodiments of the invention, and Fig. 4 is a diagrammatic figure illustrating the arrangements of the embodiments of Figs. 1, 2 and 3 in a turbo-alternator.

Similar reference numerals denote like parts in the several figures.

Referring first to Fig. 1, one end of a rotor shaft of a turbo-alternator appears at 1 together with part of the bearing liner 2 supporting this end of the rotor shaft in a pedestal bearing, part of which appears and is designated 3. The arrangement comprises a pinion 4 meshing with a gear wheel 5. The pinion 4 is provided with journal portions received in bearing liners 6 mounted in a spacer frame comprising two end plates 7 rigidly connected together by a back plate 8. The gear wheel 5 is provided with journal portions received in bearing liners 9 in the spacer frame 7, 8. The pinion 4 is provided with an axial bore 10 through which extends a shaft 11 forming an extension of the alternator rotor shaft 1, said extension conveniently being small in diameter compared with the shaft 1 and being attached to the latter in any suitable manner, for example by a flanged end 12 of the shaft extension 11, and bolts such as 13.

At its end remote from the alternator the extension shaft 11 is connected resiliently with the pinion 4. For this purpose, in the arrangement illustrated, the shaft 11 has made fast thereto a flanged coupling element 14, whilst the adjacent end of the pinion 4 is provided with a corresponding flanged coupling part 15, and the coupling parts 14 and 15 are connected with one another by an annular member 16 of resilient nature. For example the member 16 may comprise rubber, the end surface of the members being bonded to the faces of the parts 14 and 15.

The gear wheel 5 is provided with an axial bore 17 through which extends an output shaft 18 which is journalled at one end within a bearing 19 provided in the pedestal 3 of the alternator shaft bearing, and is journalled at its other end in a bearing 20 in a bore in an end wall 21 of a casing 22 forming an extension of the pedestal bearing 3. The casing may be completed by the bed plate at 23 of the turbo-alternator. It will be understood that suitable openings provided with cover plates (not shown) will be provided, such as in a side wall of the casing 22, in order to allow assembly of the parts, or the casing 22 may be formed by the end wall 21 and top and side walls separate from the bed plate 23 and pedestal bearing 3.

The shaft 18 extends as shown at 24 through the wall 21 and is coupled externally of said casing with the exciter. Internally of the casing the shaft 18 has made fast thereto a pair of flanged coupling elements 25 and 26, whilst the ends of the journalled portions of the gear wheel 5 are formed as coupling flanges 27 and 28. The flange 25 is torsionally connected with the flange 27 by means of an annular resilient member 29 for example, of rubber having its end faces bonded to the end faces of the flanges. Similarly the flanges 28 and 26 are torsionally coupled together by an annular resilient member 30.

The bores 10 and 17 provide substantial clearance of the pinion and gear wheel with respect to the shafts 11 and 18 so that the pinion and gear wheel, which are maintained correctly in mesh by the spacer frame 7, 8, will be permitted to vibrate without transmission of vibration and noise to the shafts 11 and 18 and to the casing 22 nor to the external extension 24 of the output shaft 18.

With the arrangement shown in Fig. 1 the pinion and gear wheel are connected with their respective shafts, each by means of the resilient couplings which are resilient in all directions of transmission vibration. The vibration emanating from the gear teeth is thus subjected to the attenuating effect of the resilient couplings before reaching the shafts 1 and 18 and passing to the casing 3 through the bearings 2, 19 and 20.

The resilient couplings in the arrangements as so far described take the full weight of the transmission elements and the spacer frame 7, 8 and will therefore be distorted so that the axis of each transmission element will not be coincident with that of the associated shaft. The spacing between the gear centres will be accurately maintained by the rigid spacer frame.

With the simple arrangement of rubber coupling illustrated the rubber of each coupling will be in shear for the vertical dead load and for the torque transmission, but will be in compression or tension for end thrust between the shaft 1 and the pinion and gear wheel. By suitable design of the coupling, for example by the use of axially extending flanges or other axially extending members, the conditions just above set forth may be interchanged if desired, whilst however retaining the resilience of the coupling in all directions of vibration transmission.

It will be understood that the vibration of the spacer frame due to the running of the transmission elements will be substantially unmodified, but this vibration before transmission to the casing 22 will be attenuated by the resilient couplings. Direct airborne radiation of vibration from the gears and spacer will occur, but will be attenuated by the enclosing casing 22.

In Fig. 4 a turbo-alternator is shown in outline at 40 being mounted on the bed plate 23a and including the pedestal bearing 3 and a second pedestal bearing 41 at the other end of the alternator. The turbine shown at 42 drives the alternator rotor shaft 1, whilst the output shaft 24 of the gear assembly described with reference to Fig. 1 is coupled with the exciter shown at 43.

Fig. 2 shows a modification of the arrangement of Fig. 1, wherein the output shaft 18, instead of being journalled in the bearings 19 and 20 of Fig. 1, forms an overhung extension of the armature shaft, one end of which appears at 50, of the exciter shown fragmentarily at 43. The shaft 18 is coupled with the gear wheel 5 by a single resilient coupling comprising the coupling elements 25 and 27 and resilient member 29. It will be understood that if desired further coupling elements may be provided at the right-hand end of the gear wheel corresponding with the elements 26, 28 and 30 of Fig. 1.

The shaft 18 extends with considerable clearance through an opening 51 in the end wall 21 of the casing, and this opening is sealed by a resilient gland which may comprise an annular sheet 52 of rubber in contact with the periphery of the shaft 18 and secured to the outer face of the wall 21 by means of an annular metal retaining ring 53 secured, such as by bolts (not shown) to the wall 21, so as to clamp the sheet 52 in place.

In the further embodiment shown in Fig. 3, the pinion 4 and gear wheel 5 are not provided with axial bores, but are coupled with the rotor shaft 1 of the output shaft 18 by single resilient couplings located respectively adjacent the shafts 1 and 18. Thus the shaft 1 is provided with a flanged end 60 which is connected by a resilient member 61 with a flanged element 62 on the adjacent end of the pinion member 4. The resilient member 61 conveniently comprises an annular rubber member having its faces bonded to the flanges 61 and 62. The shaft 18 forms an overhung extension of the rotor shaft (not shown) of the exciter, and has made fast thereto a flanged coupling element 63 which is connected by a resilient member 64 with a flanged element 65 formed on the adjacent end of the gear wheel member 5. The member 64 again conveniently comprises an annular rubber member bonded to the faces of the flanges 63 and 65. The shaft 18 again extends through an opening 51 in the end wall 21 of the casing and is sealed with respect to the latter by an annular sheet of rubber 52 and clamping ring 53 in the manner described with reference to Fig. 2.

As stated hereinbefore in the arrangements described with reference to Figs. 1, 2 and 3, the spacer frame 8 and the transmission elements are supported by the resilient couplings. In order to reduce the cyclic stresses in the couplings due to the misalignment of the centres of rotation of the transmission elements from the shafts, the frame may be arranged to be supported at least partly from the casing by further resilient means. Means of this kind are indicated in Figs. 3 and 4 of United States application, Serial No. 451,895, filed August 24, 1954, now Patent No. 2,822,700, aforesaid, and may be employed in the embodiments of the present invention herein described. Thus the spacer frame in Figs. 1, 2 and 3 may be wholly or partly supported or its movements controlled by means of one or more resilient connecting members between the frame and the casing 22 or bedplate 23, such as shown at X in Figs. 1, 2 and 3 for example, this element or elements being resilient so as to attenuate transmission of vibration from the frame or inner casing to the outer casing.

It will further be understood that the arrangements are not restricted to single-stage gearing, but any number of gear wheels may be located within the casing 3 by means of two or more pairs of gear wheels on the same or different spacer frames.

The scope of the invention is set forth in the claims.
What I claim is:

1. An electrical generator having an armature shaft and a main bearing and main bearing support therefor in combination with an exciter having an armature, and an enclosed gear drive for coupling the armature shaft of the generator with the exciter armature comprising a casing formed at least in part by the main bearing support of the generator, an extension of the generator shaft through said main bearing into said casing, resilient coupling means located within said casing and coupling said generator shaft extension with one of the gear wheels of the gear drive, spacing means having bearings in which said gear wheels are mounted for maintaining said gear wheels in correctly spaced relationship, said spacing means being enclosed by and resiliently mounted in said casing, an output shaft extending outwardly through a wall of said casing for coupling the output shaft exteriorly of the casing with the exciter armature, and further resilient coupling means located within said casing and coupling a second gear wheel of said gear drive with the output shaft.

2. An electrical generator as defined in claim 1, in which one of said gear wheels has an axial bore therein and said extension of the generator shaft extends with clearance through the axial bore of said gear wheel and is connected at the end thereof remote from the generator with the adjacent end of said gear wheel by said resilient coupling means.

3. An electrical generator as defined in claim 1, in which said gear wheel coupled with the generator shaft carries at the end thereof adjacent the generator a flanged coupling element connected by resilient means with a corresponding coupling element formed on the adjacent end of the generator shaft.

4. An electrical generator as defined in claim 1, in which one of the gear wheels of said gear drive is provided with an axial bore, and said output shaft extends with clearance through the axial bore in said gear wheel and is coupled with said gear wheel by said further resilient coupling means at least at the end of said gear wheel remote from the exciter.

5. An electrical generator as defined in claim 1, in which one of the gear wheels of said gear drive is provided with an axial bore, and said output shaft extends with clearance through the axial bore in said gear wheel and is coupled with said gear wheel by said further resilient coupling means at both ends of said gear wheel.

6. An electrical generator as defined in claim 1, in which the ends of said output shaft are journalled in said main bearing support of the generator and in a wall of said casing.

7. An electrical generator as defined in claim 1, in which said output shaft is formed by an overhung extension of the exciter armature shaft, and a wall of said casing is provided with an opening through which said output shaft extends, and including resilient means for sealing said opening around the output shaft.

8. An electrical generator as defined in claim 1, in which said output shaft comprises an overhung extension of the exciter armature shaft, and said further resilient coupling means comprises a flanged coupling element on said second gear wheel, a corresponding coupling element mounted on an end of the overhung extension of the exciter armature shaft, and resilient means connecting said coupling elements, said extension passing with clearance through a wall of said casing enclosing the gear drive, and including resilient means sealing said extension with respect to said wall of the casing.

9. An electrical generator as defined in claim 1, in which said resilient coupling means comprise coupling elements and rubber elements bonded thereto.

10. An electrical generator as defined in claim 1, in which said spacing means are at least partly supported within said casing by further resilient means located within said casing.

References Cited in the file of this patent

UNITED STATES PATENTS

| | | |
|---|---|---|
| 1,961,679 | Walti | June 5, 1934 |
| 1,980,165 | Burleigh | Nov. 13, 1934 |
| 2,070,329 | Brecht | Feb. 9, 1937 |
| 2,385,369 | Niekamp | Sept. 25, 1945 |

FOREIGN PATENTS

| | | |
|---|---|---|
| 597,063 | Great Britain | Jan. 16, 1948 |